(Model.)
P. MIHAN.
AIR INJECTING VENTILATOR.
No. 259,035. Patented June 6, 1882.
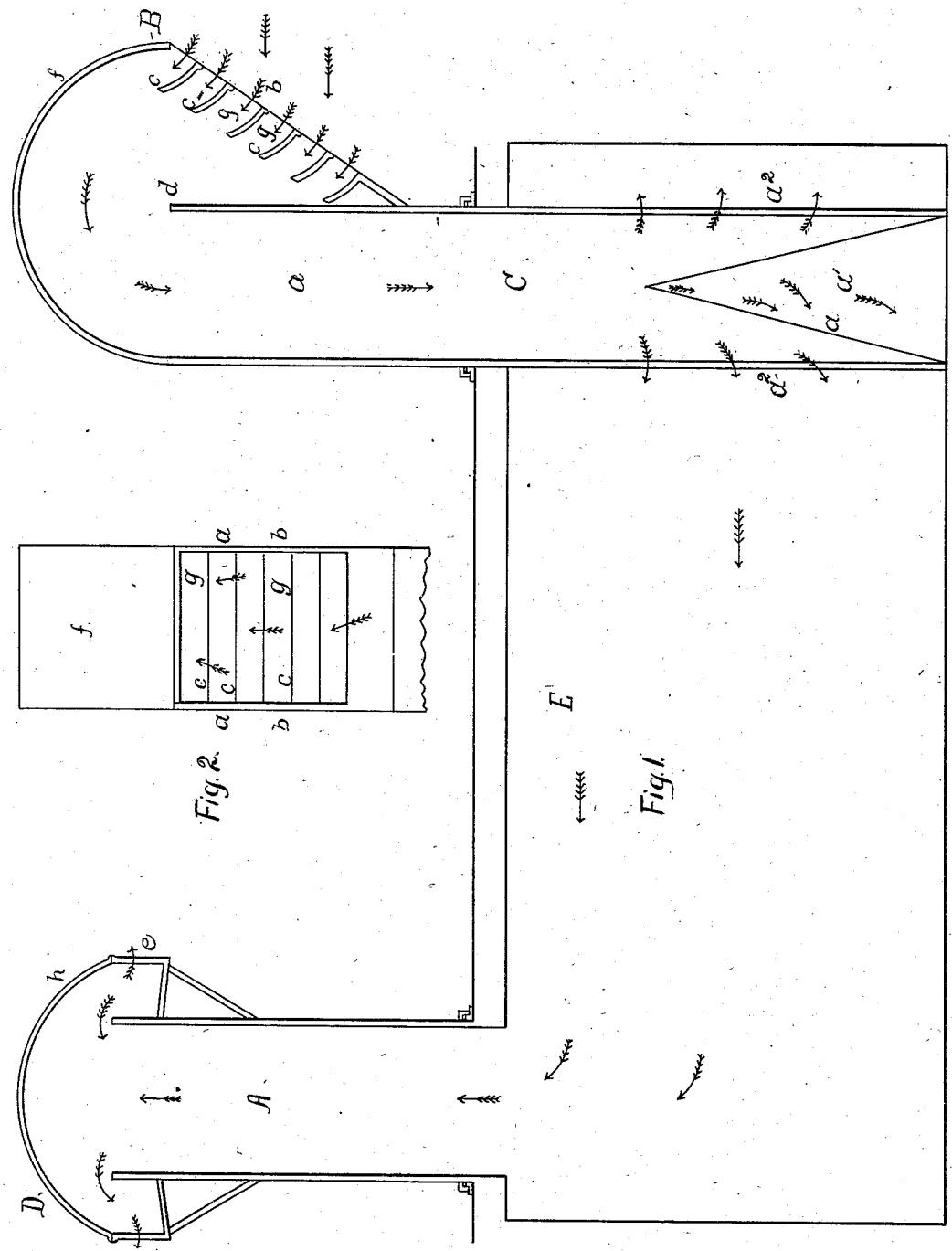
Witnesses:
W. J. Dudley.
J. D. McLellan.
Inventor:
Patrick Mihan
By Porter & Hutchinson
Attys

UNITED STATES PATENT OFFICE.

PATRICK MIHAN, OF CHELSEA, MASSACHUSETTS.

AIR-INJECTING VENTILATOR.

SPECIFICATION forming part of Letters Patent No. 259,035, dated June 6, 1882.

Application filed May 28, 1881. (Model.) Patented in England November 23, 1880, No. 4,855.

*To all whom it may concern:*

Be it known that I, PATRICK MIHAN, of Chelsea, State of Massachusetts, have invented an Air-Injecting Ventilator, of which the following is a specification.

This invention relates to that class of devices by which the air in rooms, cabins of vessels, public halls, storehouses, and other inclosed spaces is intended to be gradually changed by substituting pure air introduced into such spaces for the foul air which is thereby displaced; and the invention will, in connection with the appended drawings, be hereinafter fully described, and specifically defined in the appended claims.

Figure 1 represents my improved ventilator in vertical section and as applied to a tank or compartment provided with an escape-flue, which tank and flue are also shown in vertical section. Fig. 2 is a detached front elevation of the head or upper portion of my said injector, taken as viewed from the right in Fig. 1.

E represents a tank, reservoir, ship's cabin, or compartment to be ventilated.

B is the air-injecting ventilator, which is formed with the vertical conduit C, which may for most purposes be preferably formed rectangular in cross-section, and the several sides $a$ thereof, at or near the bottom, are formed with wedge-shaped openings $a'$ for the escape of the inpassing air into the apartment E. The side $a^2$ of said conduit C terminates at its upper end, $d$, which constitutes the radius-point, from which is projected the arc $f$, the right-hand terminus whereof is at or slightly below a horizontal line projected from said radius-point $d$, said line $f$ constituting the contour of the head-casing or top of the ventilator-conduit.

The two sides $a$ $a$ of the head, as shown in Fig. 2, are cut by lines $b$, which extend from said terminus of line $f$ in a converging direction and intersect sides $a$, as shown in Fig. 1. Extending from one to the other of said sides $a$ $a$ are the curved partitions $c$, which equally subdivide the space on line $b$, as is shown in Figs. 1 and 2, the lower one of said spaces being closed in front as the partition at its inner edge joins the wall $a^2$.

Said compartment E is shown as provided with an air-escape device, D, having an outlet-conduit, A, which communicates freely with the compartment, but its walls do not descend therein; and it is shown as provided with the head having the curved cover $h$, and with a series of escape-passages, $e$ $e$, arranged below said top $h$ and around the periphery thereof; but the described construction of said escape device D constitutes no part of my present invention, and such construction is only represented for the purpose of showing some efficient air-escape in connection with the injector.

The practical operation of my invention is as follows: The air enters through the spaces $g$ between the curved partitions $c$. Thence it is deflected by the curved top $f$ as it advances into conduit C, and as it arrives in its descent at the passages $a'$ it escapes into the apartment E, from which it expels the foul air up the conduit A. By means of the semicircular line $f$ for the head of the injector and the oblique line $b$, along which are arranged the openings $g$, the air which enters said openings is first slightly deflected upward by the curve of partitions $c$, which gives it a movement parallel with the line of head $f$. It is then deflected, stratum by stratum, by and around the arc of the circle, each stratum describing an arc unlike the others, but all entering the conduit C, whence they descend, as described. By forming outlet-passages $a'$ with an upwardly-diminishing width but a limited portion of the injected air escapes at the upper portion of the apartment, while the greater portion escapes near the bottom, thus allowing the foul air to escape from the upper portion of the room without mingling with or contaminating the pure air as it enters.

The direction of the air-currents is illustrated by the arrows in the different parts of the drawings.

While air will enter through the injector with rapidity and force, yet water, by reason of its greater weight and entire lack of elasticity, will not to any material extent find its way into conduit C unless the same be submerged below the radius-point.

By forming the cowl as an arc of a circle drawn from point $d$, and with the face on line $b$, the air all enters from the same side of the conduit, thereby avoiding the friction and consequent retardation which would result from the introduction of the air from opposite sides of the conduit unless a central partition was arranged in the conduit to act as a downward deflector of the currents before the opposing currents encountered each other; and in case such partition was so employed, then the currents would not pass along such easy and natural curves as are feasible in a cowl arranged in the manner employed by me.

As currents of air normally move in straight horizontal lines, it must first be deflected upward in order to conduct it downward, when the ventilator is arranged to admit air and yet exclude water; and if an arc was described from the point of intersection of lines $b$ and $f$, such arc commencing at $d$ and terminating directly below said radius-point, the space between said last-described points would constitute a mouth having the same area of cross-section as conduit C and adapted to receive the horizontal currents of air; but it is obvious that line $b$ affords an opening or throat of greater area than could be obtained by such described prolongation of the conduit to a horizontal direction; and, besides, the deflecting action in my construction is exactly opposite to what would result from the supposed construction, because in my ventilator the air first enters the upper space, $g$, in line $b$, and is by curved partitions $c$ deflected upward till it encounters line $f$, when it moves in a line coincident therewith. The air entering the space next below the first is deflected upward till it encounters the already-entered upper stratum, which it follows by a slightly sharper curve; and so of every stratum which enters said spaces. Each is controlled by the stratum above it, which enters earlier, and so serves to give direction to that below itself, while if the conduit terminated by an open mouth cut by a vertical line, all the volume of air would enter simultaneously, and the lower stratum would, by its moving on the longer line of the curve of the conduit, be first deflected upward, and as it passed point $d$ would crosscut and intercept all the other strata of the volume of air which would be moving on lines of a shorter curve. Besides, the water, as before suggested, even though it be dashed through between partitions $c$, will yet be so broken thereby in its force that it will not pass over point $d$, as would be the result if it entered in a solid body at an open mouth of the conduit.

I am aware that it is common in ventilators to construct them with a curved cowl and with air-spaces below the same, at the sides thereof. Hence I do not broadly claim such construction, my invention consisting in the construction shown and described.

I claim as my invention—

1. A ventilator having a conduit, C, and a head formed as an arc of a circle, $f$, whose radius-point or center is at or near one side of said conduit, and with the air-passages arranged in the oblique line $b$, which intersects the line of said conduit and said arc, substantially as specified.

2. In a ventilator formed with the head projecting beyond the walls of the conduit, the oblique line $b$, intersecting the wall of the conduit and the arc of the head and subdivided into passages $g$, substantially as specified.

3. In a ventilator, the combination of the arc-like head B, whose radius-point or center is at or near the side of conduit C, the oblique line $b$, intersecting said arc, and the openings $g$ in said oblique line subdivided by the curved partitions $c$, substantially as specified.

PATRICK MIHAN.

Witnesses:
T. W. PORTER,
H. H. LETTENEY.